Sept. 9, 1941.   A. T. SCHEIWER   2,255,334
COUPLING
Filed Oct. 8, 1938

INVENTOR.
Albert T. Scheiwer
BY
ATTORNEY.

Patented Sept. 9, 1941

2,255,334

UNITED STATES PATENT OFFICE 2,255,334

COUPLING

Albert T. Scheiwer, Erie, Pa.

Application October 8, 1938, Serial No. 234,062

2 Claims. (Cl. 284—4)

This invention relates generally to couplings and more particularly to snap type couplings.

All devices of this character made according to the teachings of the prior art, and with which I am familiar, have had no means for keeping foreign matter and moisture away from the contacting surfaces of the female member of the coupling when disconnected with the result that the parts would quickly wear and connection of the male and female members were many times rendered practically unconnectable. It was necessary to apply heat to these couplings in order to make connections in cold weather. None of these prior couplings have a swiveling movement which resulted in their being twisted in two parts.

It is, accordingly, an object of my invention to overcome the above and other defects in couplings, and it is more particularly an object of my invention to provide a coupling which is practically free from moisture and foreign matter at all times.

Another object of my invention is to provide a coupling which swivels.

Another object of my invention is to provide a coupling which is simple in construction, cheap in cost, efficient in operation, and easy to manufacture.

Another object of my invention is to provide a coupling which is easily assembled and disassembled.

Another object of my invention is to provide improved sealing means between the male and female members of a snap type coupling.

Another object of my invention is to provide improved retaining means for the ball members.

Another object of my invention is to provide means for automatically removing the cap from the opening of the female member when the female member is disposed for connection to the male member.

Another object of my invention is to provide a coupling with automatically removable means for closing the female member of the coupling when the male and female members are disconnected.

Other objects of my invention will become evident from the following detailed description, taken in conjunction with the accompanying drawing, in which Fig. 1 is a side elevational view partly in section showing my novel coupling in a locked position.

Figure 1:
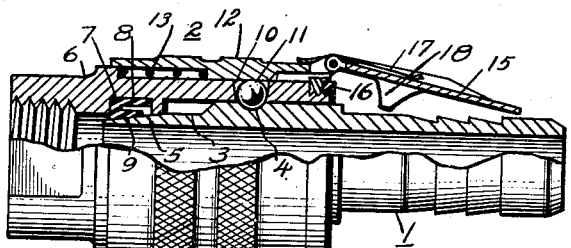
Figure 3:
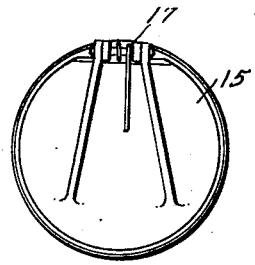
Fig. 3 is an end view of the coupling shown in Fig. 1.
Figure 2:
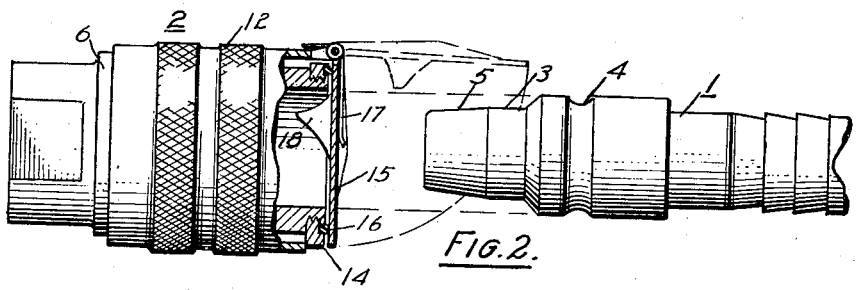
Fig. 2 is a side elevational view partly in section showing the coupling in Fig. 1 in a normally disconnected position.
Figure 4:
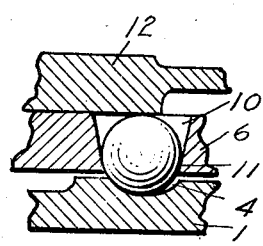
Fig. 4 is an enlarged view of the ball retaining means.

Referring to the drawing, Figs. 1 and 2 disclose a male and a female member 1 and 2. The male member 1 has a connecting portion 3 with a peripheral groove 4 and a tapered end 5. The female member 2 comprises a cylindrical shell 6 having an interiorly formed groove 7 for disposing a sealing member 8 of substantially U-shaped cross-section. The sealing member 8 has a tapered interior surface 9 to engage the tapered portion 5 of the connecting portion 3 of the male member 1. The shell 6 has tapered apertures 10 for retaining ball members 11 which engage the groove 7 in the connecting portion 3 of the male member 1 to secure the male and female members 1 and 2 together. A telescopically disposed sleeve 12 surrounds the shell 6 and a spring 13 urges the sleeve 12 against the collar 14 threadably engaged to the shell 6 to normally hold the ball members 11 in engagement with the groove 7 to secure the male and female members 1 and 2 together. A cover 15 is hingedly supported on the sleeve 12 and covers the open end of the female member 2. The cover 15 is provided with a projecting portion 18 which causes the cover 15 to move to an open position automatically when the sleeve 12 is moved rearwardly. A washer 16 is disposed on the face of the collar 14 to form a more perfect seal when the cover 15 is seated against the face of the collar 14 on the female member 2. A spring member 17 urges the cover 15 against the washer 16 to provide a more perfect seal and prevent moisture and dirt from entering the open end of the female member 2.

In operation, the sleeve 12 is moved against the force of the spring 13 to free the ball members 11 and permit the insertion of the connecting portion 3 of the male member 1 in the open end of the female member 2. Upon movement of the sleeve 12, the projecting portion 18 on the cover 15 causes the cover 15 to move to an open position as shown in Fig. 1. In this position, the connecting portion 3 of the male member 1 may be freely inserted in the opening in the female member 2. Upon release of the sleeve 12, the ball members 11 are forced into engagement with the groove 4 in the connecting portion 3 of the male member 1 to secure the male and female members 1 and 2 together. To disconnect the male and female members 1 and 2, the sleeve 12 is released thereby freeing the ball members 11 to permit the withdrawal of the male member 1.

It will be seen that I have provided a snap type coupling which excludes moisture and dirt from the working parts, which has novel sealing means, and many other novel features of design to make a more efficient coupling than those now on the market.

Various changes may be made in the specific embodiment of the present invention without departing from the spirit of the present invention, or from the scope of the appended claims.

What I claim is:

1. A coupling comprising a male member having a connecting portion with a peripheral groove, a female member comprising a cylindrical shell, ball members carried by said shell for engagement with said groove, a telescopically disposed sleeve on said shell for holding said ball members in engagement with said groove to secure said male and female members together, a cover disposed on said sleeve for sealing the open end of said female member when said male and female members are disconnected and a cam member integral with said cover movable into the opening in said shell when said male and female members are disconnected and adapted to automatically move said cover to an open position when said sleeve is moved on said shell to free said ball members whereby said male member may freely enter said female member.

2. A coupling comprising a male member having a connecting portion with a peripheral groove, a female member comprising a cylindrical portion, ball members carried by said cylindrical portion, sealing means between said male and female members, a telescopically disposed sleeve on said cylindrical portion for holding said ball members in engagement with said groove to secure said male and female members together, a cover for sealing the open end of said female member when said male and female members are disconnected, and means cooperating with said sleeve to automatically move said cover to an open position when said male and female members are disconnected when said sleeve is moved on said cylindrical portion to free said ball members whereby said male member may freely enter said female member.

ALBERT T. SCHEIWER.